May 28, 1940. J. J. TOMALIS 2,202,324
METHOD AND APPARATUS FOR HEADING SCREW BLANKS OR THE LIKE
Filed Dec. 28, 1938
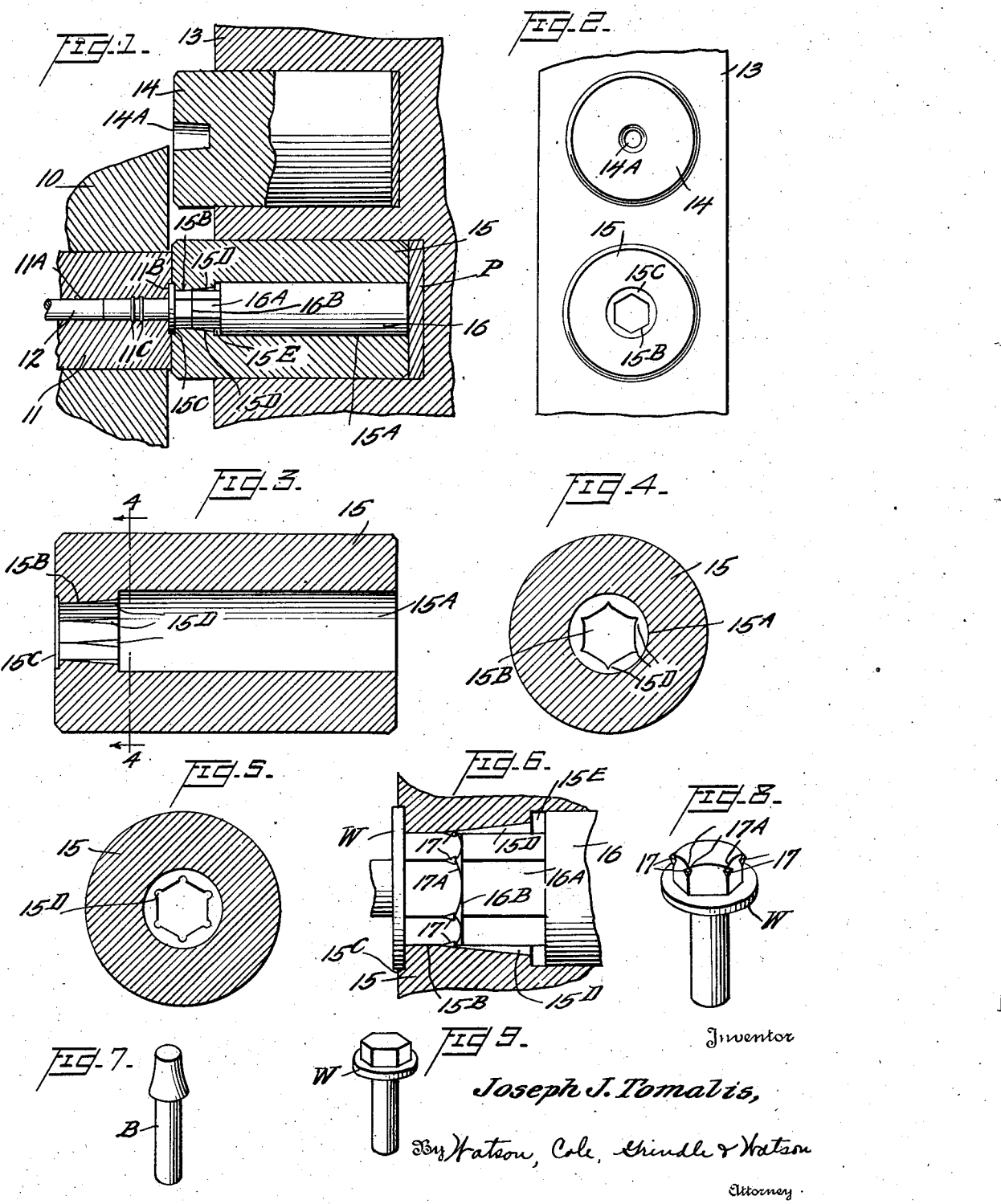
Inventor
Joseph J. Tomalis,
By Watson, Cole, Grindle & Watson
Attorney Patented May 28, 1940

2,202,324

UNITED STATES PATENT OFFICE 2,202,324

METHOD AND APPARATUS FOR HEADING SCREW BLANKS OR THE LIKE

Joseph J. Tomalis, Providence, R. I., assignor to American Screw Company, Providence, R. I., a corporation of Rhode Island Application December 28, 1938, Serial No. 248,107

9 Claims. (Cl. 10—15)

This invention relates to a method and apparatus for forming heads on blanks for use in making screws, bolts or the like and particularly to blanks having a hexagon or other polygonal shaped head and a washer arranged between the head and shank and integral therewith.

In the manufacture of screws or bolts with a hexagon head it is very essential that the head be accurately formed with the side faces thereof straight and flat and the corners straight and sharply defined from the bottom to the top of the head. This is necessary to enable a wrench to be accurately fitted to the head and prevent it from slipping or spinning around the head in turning the screw. This requirement of accuracy is so essential that users of hexagon head products generally specify and require that the corners of the head shall form sharply defined lines from bottom to top of the head. To obtain the required accuracy, manufacturers of hexagon head products quite generally follow the practice of first heading the bolts or screws and then subjecting them to a trimming or machining operation longitudinally of the axis to accurately finish the flat faces and corners thereof. Such operation adds greatly to the expense of the products, and since the trimming or machining takes place in a direction parallel to the axis of the screw or bolt, such operation is obviously impossible where a washer is formed integral with the hexagon head and shank of the screw or bolt.

Heretofore it has also been found impossible to produce accurate and satisfactory hexagon heads direct from a heading machine without the use of complicated and expensive equipment. This difficulty may be explained by the fact that if the exact shape of the finished head desired is duplicated in the depression or cavity of a punch, such as generally used in heading machines, and the punch is used to upset or force into the cavity the necessary amount of metal to form the head, a certain amount of air will be trapped inside the punch cavity and compressed as the metal fills up the cavity. The air thus trapped and compressed is forced into the corners of the punch cavity to form air pockets, and in the case of hexagon heads particularly the result is that rounded and imperfect corners are formed on the heads where the air pockets did not allow the metal to completely fill out the corners of the cavity. Furthermore, even if provision is made for the escape of air from the punch cavity, it is very difficult and practically impossible to force the metal into the punch cavity with sufficient pressure to cause it to completely fill all corners thereof and produce perfect hexagon heads.

One aim of the present invention is to overcome the manufacturing difficulties above indicated by providing small grooves or passages in the punch which are so located that air trapped in the punch cavity may escape therefrom during the punching operation and not interfere with the formation of the head. Another purpose of the invention is to form such grooves at each corner of the punch cavity which will not only permit escape of air, but also allow a small amount of excess metal to flow into the groove at each corner of the cavity, which excess metal is smoothed or drawn down by the outer walls of the punch cavity as the blank head is withdrawn therefrom, this smoothing or drawing operation resulting in the formation of a straight sharp corner at each corner of the head.

Machines for the cold heading of blanks are old and well known, an example of which is shown in U. S. Patent No. 590,576. Since the present invention relates to that type of machines, it is deemed sufficient to show and describe herein only the parts directly affected by the improvements. The accompanying drawing, forming a part hereof, therefore illustrates the invention as applied to the type of machine mentioned.

In said drawing:

Figure 1 is a vertical sectional view through the movable punch and stationary die assemblies, a first and second punch being illustrated;

Figure 2 is a vertical view from the front of the punch assembly;

Figure 3 is a longitudinal sectional view of the second or finishing punch with the pin or core thereof removed;

Figure 4 is a transverse sectional view on the line 4—4 of Figure 3, looking in the direction of the arrows;

Figure 5 is a view similar to Figure 4, but showing a slightly modified form of construction;

Figure 6 is a longitudinal fragmentary section on an enlarged scale showing the action of the punch in forming the hexagon screw heads;

Figure 7 shows the blank as formed by the first punch, and Figure 8 shows the blank as formed by the second punch before it is withdrawn therefrom and the excess metal at the corners thereof drawn or smoothed down; and Figure 9 shows the blank in finished form.

Referring to the drawing in detail, 10 indicates a stationary die block or anvil section, usual in this type of machine, and in which the fixed blank receiving die 11 is mounted. A knock-out pin 12 operates through an opening or hole 11A in the die 11, in the usual manner, for ejecting the finished blank from the die. A shallow depression 11B is formed on the outer face of the die 11 around the hole 11A, which depression cooperates with a similar depression on the second punch to form the washer on the blank. Within the hole 11A of the die, a plurality of shallow circumferential ring-shaped recesses or depressions 11C are also formed, for a purpose later explained.

Opposed to the die block and die is a punch holder indicated at 13 carried by the usual reciprocating crosshead (not shown) and the latter is suitably operated to present the punches 14 and 15 successively to a blank in the die 11. In machines of this kind, as shown by the aforementioned patent, means are also provided for cutting off a desired length of wire to form a blank and presenting such wire blank into position opposite the opening in the stationary die 11. After the wire blank is thus positioned, the first punch 14 is brought forward and the depression 14A therein surrounds the protruding end of the wire blank which is thus forced into the opening 11A of the stationary die 11 against the knock-out pin 12. Further forward motion of the punch 14 causes the blank to be upset in the die and the punch until it substantially fills the depression 14A resulting in the semi-finished blank B shown in Figure 7.

Following the operation of the first punch, the punch holder recedes, moves laterally of the die, and again advances, this time presenting the second or finishing punch 15 to the blank held in the stationary die 11.

The finishing punch 15 is firmly secured in an opening in the holder 13 and preferably the rear end thereof rests against a thrust plate or plug P tightly fitted in the holder 13. As shown particularly in Figures 1 and 3, the punch 15 is provided with a central opening or hole extending longitudinally thereof. This hole includes a rear or inner portion 15A and a front or outer portion 15B, and surrounding the outer end of this hole is a shallow depression 15C formed in the face of the punch which cooperates with the depression 11B of the die to form the washer W on the blank, as shown in Figures 8 and 9. The inner portion 15A of said hole is preferably made cylindrical in cross section. The front or outer portion 15B thereof forms the main punch cavity which is made hexagonal, and the size and cross sectional area of this cavity is the same as the size of the hexagon heads which are to be produced. At each corner of this punch cavity 15B and near the inner end thereof the material of the punch is slightly cut away or relieved to produce small pointed recesses or grooves, as indicated at 15D. These grooves preferably taper toward the forward or outer face of the punch and merge into the corners of the hexagonal cavity at a point somewhat to the rear or inwardly from the outer depression 15C. In other words, the outer portion of the punch cavity 15B for some distance back of the depression 15C is made accurately hexagonal, and toward the inner portion thereof the corners are cut away to form the small recesses or grooves 15D. The recesses 15D may be made generally triangular in transverse cross section as shown in Figure 4, or they may be formed with a rounded contour as shown in Figure 5. The purposes of these recesses or grooves will be more fully explained later.

Mounted in the longitudinal hole in the punch 15 is a core or pin 16, and this pin includes a cylindrical portion which has a sliding fit in the cylindrical portion 15A of said hole, and also a hexagonal portion 16A which closely and accurately fits in the front hexagonal cavity 15B forming part of said hole. The cylindrical portion of the pin 16 is preferably made slightly shorter than the cylindrical portion 15A of the punch so that when the pin is forced rearwardly, a small cavity or space 15E is formed at the base or rear end of the hexagonal portion 16A of the pin. The grooves 15D communicate at their rear ends with this cavity 15E. The hexagonal portion 16A of the core or pin extends outwardly into the hexagonal cavity 15B, and the outer flat end thereof indicated at 16B forms the bottom of the cavity in which the head of the blank is produced. The position of the outer flat end of the pin, or, in other words, the length of the hexagonal portion 16A thereof determines the thickness of the hexagonal head formed on the blank.

Briefly describing the operation, as the second or finishing punch 15 is advanced against a semi-finished blank in the die 11, the pin 16 is forced back against the thrust plate P, and the outer end 16B of this pin is then in such position that the hexagonal cavity in the punch will be of such depth as to form exactly the proper thickness of head desired when the metal fills up the punch cavity. As the punch is advanced toward the die and the metal is upset in the head-forming cavity, the undesirable air trapped within this cavity is free to escape through the recesses or grooves 15D into the space 15E and will not form air pockets in the punch cavity, so that the metal will fill out all parts and corners of this cavity and thus produce a completely formed head on the blank. At the same time, metal is forced into the depressions 11B and 15C to form the washer W on the blank. In addition, the metal of the blank will be slightly upset into the shallow recesses 11C formed in the die, so that the shank of the blank will then have one or more small rings of metal formed thereon. The grooves 15D provided at the corners of the cavity 15B permit escape of air from the punch cavity, and at the same time they possess another important function. They are large enough to allow some excess metal to flow out into the same, thus producing a hexagon head which adjacent such grooves is somewhat oversize along each corner for a part of the head thickness adjacent the top of the head. This excess metal is illustrated at 17 in Figures 6 and 8 and it forms a projection or enlargement on each corner of the head adjacent the top surface of the head. At this stage the corners of the blank head adjacent the top thereof are also somewhat rounded as illustrated at 17A in said figure (Figure 8), because, as before noted, it is impossible to completely obviate such rounding. As the punch recedes from the die and the newly formed blank is withdrawn from the punch cavity, there follows a stripping or drawing action effected on the excess metal 17 at the head corners, due to the fact that the outer end of the punch cavity 15B is made exactly hexagonal, as before noted. The result is that the excess metal illustrated at 17 is drawn and smoothed down so that the corners of the head are made sharp and straight, and the excess metal also fills out the rounded portions 17A at the top corners of the head.

During the stripping or drawing action above mentioned the headed blank is securely held in the die 11 by friction and by reason of the small rings produced thereon by the circumferential recesses 11C in the die. Other means for holding the blank in the die may also be employed if necessary or desirable. After the second punch has receded, the headed blank is ejected from the die 11 by the knock-out pin and when thus ejected, the small metal rings on the shank thereof are extruded or stripped back along the shank so that the finished shank will be smooth and cylindrical for receiving the screw threads.

It is apparent that the mechanism and procedure as heretofore described may be modified in various ways, and that the invention is not limited to the exact details as described and illustrated.

Having thus described the invention, what is claimed as new and desired to be secured by Letters Patent is:

1. The method of forming hexagonal heads on screw blanks or the like comprising forcing a metal blank into a hexagonal cavity in a punch to form a head thereon, said cavity having an outer portion made accurately hexagonal in cross section and also having an inner portion, the latter having a recess or groove extending outwardly from each corner thereof, whereby an enlargement or projection is formed on each corner of the head during the formation of the head in the cavity, and then withdrawing said head from said cavity through said outer portion thereof, whereby a drawing and stripping action is exerted on said enlargements to produce straight and sharp corners on the head from the bottom to the top thereof.

2. The method of making hexagonal heads on screw blanks which comprises the steps of forcing a metal blank into a hexagonal punch cavity having an outer portion of accurate hexagonal form and an inner portion having at each corner a groove or recess extending outwardly from the cavity, upsetting the metal of the blank into said cavity and said recesses to form a hexagonal head thereon and to form a projection on each corner thereof as the metal is forced into said cavity and grooves, and withdrawing said headed blank from said cavity through the outer portion thereof to thereby draw and smooth down said projections and accurately form the corners of the head.

3. A punch for heading screw blanks or the like, said punch having formed therein a die cavity which is hexagonal in cross section, the flat sides of said cavity extending parallel with the axis of the punch, said cavity including an outer portion and an inner portion, said outer portion having the sides and corners thereof arranged to form a true hexagon in cross section and said inner portion having a groove at each corner adjacent the inner end thereof and extending laterally outwardly from the main portion of the cavity.

4. A punch for heading screw blanks or the like, said punch having formed therein an enclosed die cavity which is hexagonal in cross section, with the sides thereof arranged parallel to the axis of the punch, said punch also having a plurality of longitudinally extending grooves formed therein, each of said grooves communicating with said cavity at one of the inner corners thereof and extending inwardly therefrom, said punch having a recess formed therein rearwardly of said die cavity with which recess the rear ends of said grooves communicate.

5. A punch for forming hexagon heads and integral washers on screw blanks or the like, said punch having formed therein a die cavity hexagonal in cross section, with the flat sides thereof arranged parallel with the axis of the punch, said punch also having a shallow depression formed on the outer face thereof surrounding said cavity, said punch also having a longitudinal recess communicating with said cavity at each inner corner thereof and extending inwardly therefrom.

6. A punch for forming hexagon heads on screw blanks or the like, said punch having formed therein a die cavity hexagonal in cross section with the flat sides thereof arranged parallel with the axis of the punch, a hexagonal core arranged in and closely fitting said cavity, the outer end of said core forming the bottom or inner end of said cavity, said punch also having formed therein a plurality of grooves communicating with said cavity at the corners of the bottom thereof.

7. A structure as defined in claim 6 in which said punch is provided with a recess rearwardly of said cavity and with which said grooves communicate.

8. A punch for forming hexagon heads on screw blanks or the like, said punch having a hole extending therethrough, the rear or inner portion of said hole being circular in cross section and the front or outer portion thereof being hexagonal in cross section, a core mounted in said hole and having a cylindrical portion fitting in the inner portion of said hole and a hexagonal portion fitting in said outer portion thereof, the outer end of said core terminating inwardly from the outer end of said hole, whereby a hexagonal cavity is formed in said punch, said punch also having a plurality of grooves therein, each of said grooves communicating at its outer end with said cavity at one of the corners thereof.

9. In apparatus of the kind described, a stationary die, a head forming punch movable toward and from said die, said die having an opening therein to receive and hold the shank of a screw blank or the like while the head is formed thereon, the wall of said opening having a shallow circumferentially extending recess formed therein into which metal is adapted to flow to form a projection on the shank when the blank is subjected to the action of said punch, whereby the blank is firmly held in the die when the punch is withdrawn therefrom, and a knock-out pin to force said blank out of the die and smooth down the projection formed on the blank by said recess.

JOSEPH J. TOMALIS.